United States Patent
Trottier et al.

(10) Patent No.: US 10,267,914 B2
(45) Date of Patent: Apr. 23, 2019

(54) METHOD AND DEVICE FOR PROBING BY WAVE PROPAGATION

(71) Applicants: ELECTRICITE DE FRANCE, Paris (FR); CENTRE NATIONAL DE LA RECHERCHE SCIENTIFIQUE—CNRS-, Paris (FR)

(72) Inventors: Camille Trottier, Montereau Fault Yonne (FR); Arnaud Derode, Paris (FR); Alexandre Aubry, Ivry sur Seine (FR)

(73) Assignees: ELECTRICITE DE FRANCE, Paris (FR); CENTRE NATIONAL DE LA RECHERCHE SCIENTIFIQUE—CNRS-, Paris (FR)

( * ) Notice: Subject to any disclaimer, the term of this patent is extended or adjusted under 35 U.S.C. 154(b) by 0 days.

(21) Appl. No.: 15/573,237

(22) PCT Filed: May 3, 2016

(86) PCT No.: PCT/FR2016/051036
§ 371 (c)(1),
(2) Date: Nov. 10, 2017

(87) PCT Pub. No.: WO2016/181054
PCT Pub. Date: Nov. 17, 2016

(65) Prior Publication Data
US 2018/0088232 A1    Mar. 29, 2018

(30) Foreign Application Priority Data

May 12, 2015  (FR) ..................................... 15 54258

(51) Int. Cl.
*G01N 29/00*  (2006.01)
*G01N 29/04*  (2006.01)
(Continued)

(52) U.S. Cl.
CPC ...... *G01S 15/8977* (2013.01); *G01S 7/52036* (2013.01); *G01S 7/52046* (2013.01); *G01S 15/006* (2013.01)

(58) Field of Classification Search
CPC .. G01S 15/8977; G01S 7/52036; G01S 15/00; A61B 8/00
(Continued)

(56) References Cited

U.S. PATENT DOCUMENTS 7,656,748 B2   2/2010  Fink et al.
8,326,542 B2  12/2012  Chevion et al.
(Continued)

FOREIGN PATENT DOCUMENTS

WO  2004/086557 A2  10/2004
WO  2010/001027 A1   1/2010
(Continued)

OTHER PUBLICATIONS

Aubry et al., "Detection and imaging in a random medium: A matrix method to overcome multiple scattering and aberration," Journal of Applied Physics, American Institute of Physics, Aug. 18, 2009, vol. 106(4), pp. 044903-1-044903-19.
(Continued)

*Primary Examiner* — Lisa M Caputo
*Assistant Examiner* — Roger G Hernandez-Prewitt
(74) *Attorney, Agent, or Firm* — Drinker Biddle & Reath LLP (57) ABSTRACT

An incident wave is emitted into a medium comprising diffusers that can reflect the wave. Signals representing a reflected wave reverberated by the medium from the incident wave are captured, said captured signals being the sum of a simple diffusion component and a multiple diffusion
(Continued)

component. The captured signals are treated by separating the multiple diffusion component from the simple diffusion component.

10 Claims, 6 Drawing Sheets

(51) Int. Cl.
    *G01R 33/20*     (2006.01)
    *G01S 15/89*     (2006.01)
    *G01S 7/52*     (2006.01)
    *G01S 15/00*     (2006.01)

(58) Field of Classification Search
    USPC .................................................... 73/625, 628
    See application file for complete search history.

(56) References Cited

U.S. PATENT DOCUMENTS

| | | |
|---|---|---|
| 8,814,795 B2 | 8/2014 | Derode et al. |
| 2011/0125014 A1* | 5/2011 | Derode et al. ...... G01S 7/52046 600/437 |
| 2015/0212051 A1 | 7/2015 | Bannouf et al. |

FOREIGN PATENT DOCUMENTS

| | | |
|---|---|---|
| WO | 2013/116783 A1 | 8/2013 |
| WO | 2014/009671 A1 | 1/2014 |

OTHER PUBLICATIONS

Aubry et al., "Random Matrix Theory Applied to Acoustic Backscattering and Imaging in Complex Media," Physical Review Letters, The American Physical Society, Feb. 26, 2009, vol. 102(8), pp. 084301-1-084301-4.

Aubry et al., "Multiple scattering of ultrasound in weakly inhomogeneous media: Application to human soft tissues," Journal of the Acoustical Society of America, American Institute of Physics, New York, NY, US, Jan. 1, 2011, vol. 129(1), pp. 225-233.

Prada et al., "Eigenmodes of the time reversal operator: A solution to selective focusing in multiple-target media," Wave Motion, Elsevier Science B.V., 1994, vol. 20, pp. 151-163.

Sengupta et al., "Distributions of singular values for some random matrices," Physical Review E, The American Physical Society, Sep. 1999, vol. 60(3), pp. 3389-3392.

Shahjahan et al., "A random matrix approach to detect defects in a strongly scattering polycrystal: How the memory effect can help overcome multiple scattering," Applied Physics Letters, American Institute of Physics, Melville, NY, Jun. 9, 2014, vol. 104(23), pp. 234105-1-234105-4.

Search Report issued in related application FR 15 54258, dated Mar. 7, 2016, 3 pages.

PCT Search Report issued in related application PCT/FR2016/051036, dated Jul. 12, 2016, 3 pages.

Written Opinion issued in related application PCT/FR2016/051036, with English language translation, dated Jul. 12, 2016, 11 pages.

\* cited by examiner

METHOD AND DEVICE FOR PROBING BY WAVE PROPAGATION

CROSS-REFERENCE TO RELATED APPLICATIONS

This application is the U.S. national phase of the International Patent Application No. PCT/FR2016/051036 filed May 3, 2016, which claims the benefit of French Application No. 15 54258 filed May 12, 2015, the entire content of which is incorporated herein by reference.

FIELD

The present invention relates to methods and devices for probing by wave propagation.

BACKGROUND

The method for probing by wave propagation uses an assembly of transducers and allows for example measuring a characteristic parameter of the medium, and/or detecting a singular point of the medium, and/or creating an image of the medium.

Methods of this type are used in particular in detection and imaging systems, for example such as sonar, radar, ultrasound, etc.

In known methods of this type and in particular in ultrasound or radar imaging methods, a simple-scattering component of the captured signals is used: if each scatterer only interacts once with the wave, there is effectively a direct equivalence between the time of arrival of each echo and the distance separating the transducer and the scatterer that generated this echo. Detection of an echo at a given moment is indicative of the presence of a scatterer at the distance corresponding to the time of arrival of the echo. An image of the reflectivity of the medium, meaning the position of the various scatterers within the medium, can then be constructed from the received signals if necessary. Multiple scattering is not much used in ultrasound or radar imaging methods. These imaging methods are based on the assumption that there is negligible multiple scattering.

In the presence of a significant multiple-scattering component, particularly when scatterers contained in the medium have a high scattering power and/or are very dense within the medium, conventional imaging methods are greatly disrupted and are no longer reliable. Indeed, in this case, there is no equivalence between the time of arrival of an echo and the distance separating a transducer and a scatterer of the medium, which does not enable constructing an image of the medium.

Patent application WO-2010/001027 proposes a probing method capable of separating the multiple-scattering component from the simple-scattering component. More particularly, the method of that document comprises the following steps:

(a) an emitting step during which an assembly of transducers (meaning some or all of the transducers of the assembly) emits an incident wave in a medium which scatters said wave, (b) a measuring step during which said assembly of transducers (meaning some or all of the transducers of the assembly) captures signals representative of a reflected wave reverberated by the medium from the incident wave, said captured signals comprising:

a simple-scattering component, representative of wave paths where the reflected wave results from a single reflection of the incident wave by each scatterer of the medium, and where appropriate a multiple-scattering component, representative of wave paths where the reflected wave results from multiple successive reflections of the incident wave on the scatterers of the medium before reaching the assembly of transducers, (c) a processing step during which said captured signals are processed in order to determine characteristics of the medium (the characteristics in question may consist of an image of the medium, and/or a value of a parameter of the medium, and/or the presence or absence of a singular point such as heterogeneity, etc.), at least one component selected among the multiple-scattering component and the simple-scattering component is extracted by filtering at least one frequency transfer matrix representative of responses between transducers of the assembly of transducers, and which comprises at least the following substeps:

(c1) a windowed transfer matrix determination substep during which is determined at least one windowed frequency transfer matrix $K(T,f)$ corresponding to a windowed temporal matrix of inter-element response $K(T,t)=[k_{ij}(T,t)]$ (or response between transducers of the assembly), said windowed temporal matrix of inter-element response corresponding, over a time window close to a time T and of duration $\Delta t$, to the temporal responses $h_{ij}(t)$ between transducers of the assembly of transducers, f being the frequency, (c2) a data rotation substep during which two matrices $A1(T,f)$ and $A2(t,f)$ are calculated from the windowed frequency transfer matrix $K(T,f)$, by rotations in a first direction and extraction of components from the windowed frequency transfer matrix, (c3) a filtering substep during which the multiple-scattering component is separated from the simple-scattering component in each of matrices A1, A2, thus obtaining at least two filtered matrices $A1^F$, $A2^F$ respectively corresponding to matrices A1, A2 and each representative of either the simple-scattering component or the multiple-scattering component, (c4) a reverse data rotation substep during which a filtered windowed transfer matrix $K^F(T,f)$ is calculated from the two filtered matrices $A1^F$, $A2^F$ by rotations in a second direction opposite the first direction and extraction of components from the filtered matrices $A1^F$, $A2^F$.

SUMMARY

The present invention is intended to refine and improve the probing methods as defined above.

To this end, the processing step of the method according to the invention is such that:

during the data rotation step (c2), all components of the windowed frequency transfer matrix $K(T,f)$ are distributed in a central portion of one or the other of the two matrices $A1(T,f)$ and $A2(t,f)$, these matrices having zeroes in a portion external to the central portion, and during the reverse data rotation step (c4), all the non-zero components of the central portions of the filtered matrices $A1^F$, $A2^F$ are extracted and placed in the filtered windowed transfer matrix $K^F(T,f)$.

With these features of the method according to the invention, a greater amount of information from the medium can be taken into account in the processing step. The probing of the medium by wave propagation is therefore more effective and allows probing the medium to a greater depth.

In addition, the images of the medium that can be produced will have better spatial resolution. It is possible to use a transducer assembly having a smaller number of transducers, and therefore the method will be less costly.

In addition, separation of the components allows for example:
constructing an image of the medium using only the simple-scattering component, or
determining a characteristic parameter of the medium from the multiple-scattering component, or
determining that there is little or no multiple scattering, which also allows characterizing the medium.

In various embodiments of the method according to the invention, one or more of the following arrangements may possibly be used.

According to one aspect of the method, the windowed transfer matrix K(T,f) is a matrix of size N*N where N is odd, and during the data rotation step (c2) the two matrices $A1(T,f)=[a1_{uv}(T,f)]$ and $A2=[a2_{uv}(T,f)]$ are calculated from the windowed frequency transfer matrix $K(T,f)=[k_{ij}(T,f)]$, by the following relations:
if u+v−1−(N−1)/2 and v−u+(N+3)/2−1 are both between 1 and N, inclusive,
then $a1_{uv}(T,f)=k_{u+v-1-(N-1)/2,\ v-u+(N+3)/2-1}(T,f)$,
else $a1_{uv}(T,f)=0$, and
if u+v−(N−1)/2 and v−u+(N+3)/2−1 are both between 1 and N−1, inclusive,
then $a2_{uv}(T,f)=k_{u+v-(N-1)/2,\ v-u+(N+3)/2-1}(T,f)$,
else $a2_{uv}(T,f)=0$.

According to one aspect of the method, the data rotation substep (c2) comprises:
a first substep (c21) during which the windowed frequency transfer matrix K(T,f) is introduced into an extended matrix Ke(T,f) of greater size, all elements of the extended matrix other than those from the windowed frequency transfer matrix being zero, and
a second substep (c22) during which the two matrices A1(T,f) and A2(T,f) are calculated from the extended matrix Ke(T,f).

According to one aspect of the method, the windowed transfer matrix K(T,f) is a matrix of size N*N where N is odd, and:
during the first substep (c21), the extended matrix $Ke(T,f)=[ke_{ij}(T,f)]$ is defined by:
if i, [1+(N−1)/2; N+(N−1)/2], and
j, [1+(N−1)/2; N+(N−1)/2]
then $ke_{ij}(T,f)=k_{i-(N-1)/2,\ j-(N-1)/2}(T,f)$,
else $ke_{ij}(T,f)=0$, and
during the second substep (c22), the two matrices $A1(T,f)=[a1_{uv}(T,f)]$, $A2(T,f)=[a2_{uv}(T,f)]$ are calculated by the following relations:
$a1_{uv}(T,f)=ke_{u+v-1,\ v-u+(N+3)/2-1+(N-1)/2}(T,f)$, and
$a2_{uv}(T,f)=ke_{u+v,\ v-u+(N+3)/2-1+(N-1)/2}(T,f)$.

According to one aspect of the method, the windowed transfer matrix K(T,f) is a matrix of size N*N where N is odd, and during the reverse data rotation step (c4) the filtered windowed transfer matrix $K^F(T,f)=[k^F_{ij}(T,f)]$ is calculated from the filtered matrices $A1^F(T,f)=[a1^F_{uv}(T,f)]$, $A2^F(T,f)=[a2^F_{uv}(T,f)]$ by the following relations:
if i−j is even,
then $k^F_{ij}(T,f)=a1^F_{(i-j-1)/2+(N+1)/2,\ (i+j)/2}$,
else $k^F_{ij}(T,f)=a2^F_{(i-j-1)/2+(N+1)/2,\ (i+j-1)/2}$.

According to one aspect of the method, during the windowed transfer matrix determination substep (c1), each windowed frequency transfer matrix K(T,f) is determined by wavelet transform of the windowed temporal matrix K(T,t) corresponding, over said time window close to time T and of duration Δt, to the temporal responses $h_{ij}(t)$ between transducers of the assembly of transducers.

According to one aspect of the method, the time windows of the various windowed transfer matrices K(T,f) overlap at least pairwise.

According to one aspect of the method, during the filtering substep (c3):
a simple-scattering component $k^s_{ij}(T,f)$ is extracted from each coefficient $k_{ij}(T,f)$ of matrix K(T,f), such that the simple-scattering components $k^s_{ij}(T,f)$ are mutually coherent on each antidiagonal of said matrix K(T,f), and
a multiple-scattering component $k^M_{ij}(T,f)$ is extracted from each coefficient $k_{ij}(T,f)$ of matrix K(T,f).

According to one aspect of the method, during the emitting step the incident wave emitted in a medium is inclined by a predetermined angle to an outer surface of said medium.

The invention also relates to a device for the implementation of a probing method as defined above, comprising an assembly of transducers adapted to emit an incident wave in a scattering medium and to capture signals representative of a reflected wave reverberated by the medium from the incident wave, said captured signals comprising:
a simple-scattering component, representative of wave paths where the reflected wave results from a single reflection of the incident wave by each scatterer of the medium,
and where appropriate a multiple-scattering component, representative of wave paths where the reflected wave results from several successive reflections of the incident wave on the scatterers of the medium before reaching the assembly of transducers,
said device further comprising processing means adapted to process said captured signals in order to determine characteristics of the medium,
the processing means are adapted to extract at least one component selected among the multiple-scattering component and the simple-scattering component, by filtering at least one frequency transfer matrix representative of the responses between transducers of the assembly of transducers, and the processing means carry out at least the following substeps:
(c1) a windowed transfer matrix determination substep during which is determined at least one windowed frequency transfer matrix K(T,f) corresponding to a windowed temporal matrix of inter-element response $K(T,t)=[k_{ij}(T,t)]$, said windowed temporal matrix of inter-element response corresponding, over a time window close to a time T and of duration Δt, to the temporal responses $h_{ij}(t)$ between transducers of the assembly of transducers, f being the frequency,
(c2) a data rotation substep during which two matrices A1(T,f) and A2(T,f) are calculated from the windowed frequency transfer matrix K(T,f), by rotations in a first direction and extraction of components from the windowed frequency transfer matrix,
(c3) a filtering substep during which the multiple-scattering component is separated from the simple-scattering component in each of the matrices A1, A2, thus obtaining at least two filtered matrices $A1^F$, $A2^F$ respectively corresponding to matrices A1, A2 and each representative of either the simple-scattering component or the multiple-scattering component,
(c4) a reverse data rotation substep during which a filtered windowed transfer matrix $K^F(T,f)$ is calculated from the two filtered matrices $A1^F$, $A2^F$ by rotations in a second direction opposite the first direction and extraction of components from the filtered matrices $A1^F$, $A2^F$.

The device of the invention is such that the processing means are adapted for the following:

during the data rotation step (c2), all components of the windowed frequency transfer matrix K(T,f) are distributed in a central portion of one or the other of the two matrices A1(T,f) and A2(T,f), these matrices having zeroes in a portion external to the central portion, and during the reverse data rotation step (c4), all the non-zero components of the central portions of the filtered matrices $A1^F$, $A2^F$ are extracted and placed in the filtered windowed transfer matrix $K^F$(T,f).

BRIEF DESCRIPTION OF THE DRAWINGS

Other features and advantages of the invention will be apparent from the following description of several of its embodiments, given by way of non-limiting examples, with reference to the accompanying drawings.

In the drawings.

DETAILED DESCRIPTION

Figure 1:
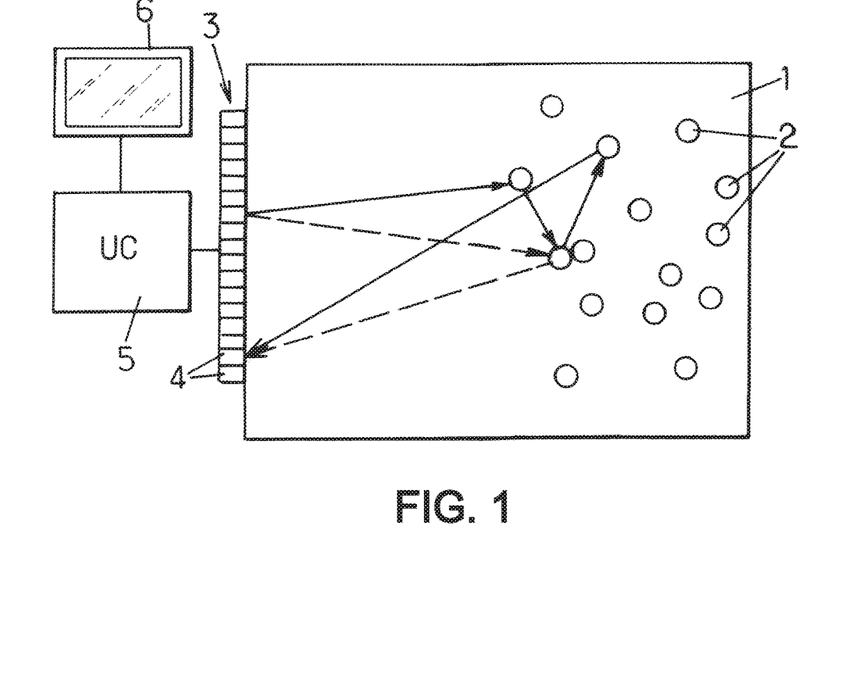
FIG. 1 is a schematic view of a device for implementing a method according to an embodiment of the invention.

FIG. 1 shows an example of a device suitable for probing a medium 1 by emitting and receiving waves. The invention will be more particularly described hereinafter for the case where the waves in question are ultrasonic waves (for example, frequencies between 2 MHz and 4), but the invention is also applicable to waves of any type, for example mechanical waves other than ultrasonic compression waves, electromagnetic waves, or other.

The medium 1 is a scattering medium for the waves in question, meaning it is heterogeneous and/or contains scatterers 2 randomly distributed and capable of reflecting the emitted waves in the medium 1.

The medium 1 in question may for example be part of the human body, and the scatterers 2 may be small particles, unresolved, contained in the medium 1 (in ultrasound such scatterers generate images of "speckles"). Of course, the medium 1 to be probed could be otherwise, for example part of an industrial object of which the structure is to be tested in a context of nondestructive testing.

The probing device represented in FIG. 1 comprises an assembly 3 of transducers 4, for example a linear array of ultrasound transducers which typically are in the form of a rigid array in contact with the medium 1. This assembly 3 comprises a number N of transducers, N for example being between 100 and 500. One may for example use an array of a hundred transducers 4 each having a width of about 0.39 mm in width. Note that the transducers 4 here are ultrasound transducers capable of converting an electrical signal into ultrasonic compression waves or vice versa, but in the meaning of this patent, transducer more generally refers to any device capable of converting an electrical signal into a wave of some type (mechanical wave, electromagnetic wave, etc.) and vice versa.

Each transducer 4 of the assembly 3 can be controlled individually by a central processing unit 5 (UC), for example comprising digital signal processing means, this central processing unit 5 able for example to present an image of the medium 1 on a screen 6.

To probe the medium 1, the central processing unit 5 sends to the transducers 4 electrical signals which are converted by said transducers into waves emitted in the medium 1, in this case ultrasonic compression waves, and these waves are partially reflected by the scatterers 2 contained in the medium. A portion of the scattered waves (or echoes) thus returns to the transducers 4 which capture and convert them into electrical reception signals subsequently processed by the central processing unit 5.

These waves return to the transducers 4:

either after being reflected once by the scatterers 2 (for example along the path schematically indicated with dashed lines in FIG. 1), in other words after a simple scattering, or after being successively reflected on several scatterers 2 (for example along the path schematically indicated with solid lines in FIG. 1), in other words after a multiple scattering.

The overall wave scattered by the medium 1 and returned to the transducers 4 therefore includes two contributions:

a "simple-scattering" contribution corresponding to cases where the incident wave only undergoes a single reflection by each scatterer 2 of the medium 1 before returning to the transducers 4, a "multiple-scattering" contribution corresponding to cases where the incident wave undergoes several successive reflections on scatterers 2 of the medium before reaching the transducers 4.

This method allows separating these two contributions by filtering, so that only one of them is used or so that they are processed separately. For example:

the simple-scattering contribution is useful for constructing an image of the medium, in particular by ultrasound in the case described here (but it could also be a seismographic image in the case of seismic waves, or a radar image in the case of electromagnetic waves, or other): in fact, since each scatterer 2 only interacts once with the incident wave, there is a direct equivalence between the time of arrival of each echo and the distance between the sensor and the scatterer that generated this echo. Detection of an echo signal at a given time is indicative of the presence of a scatterer 2 at the distance corresponding to the time of arrival of the echo. An image of the reflectivity of the medium, meaning the position of the various scattering centers within the medium, can then be constructed from the recorded signals;

the multiple-scattering contribution may also be useful for characterizing disordered media, because it allows measuring statistical parameters such as the average unobstructed path or the scattering coefficient of a wave propagating through a random medium; the relative importance of this multiple-scattering contribution also allows characterizing the reliability of an image of the medium 1, obtained for example by ultrasound.

In order to separate the simple-scattering and multiple-scattering contributions, first the inter-element responses of each pair of transducers 4 of the assembly 3 are recorded.

Figure 2:
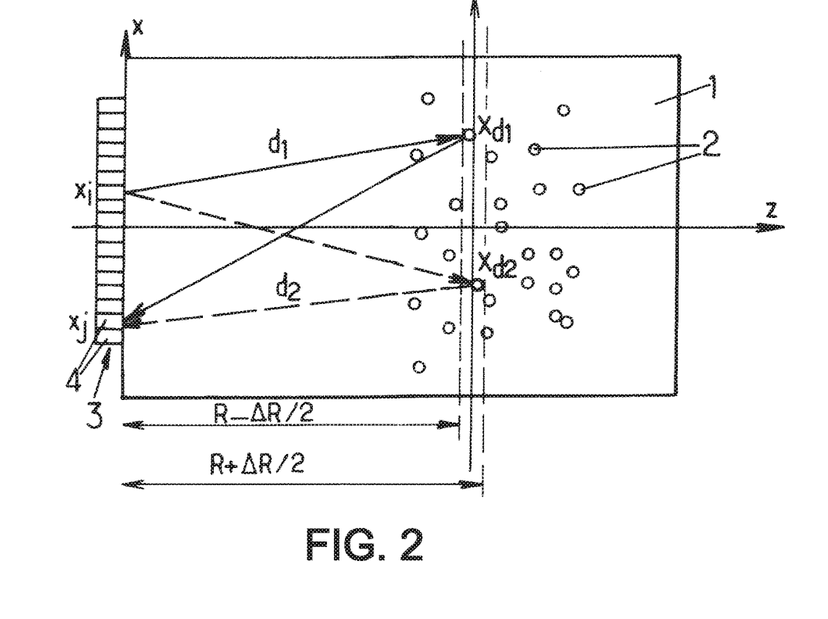
FIG. 2 is a diagram representing two simple-scattering paths contributing to the field backscattered by the probed medium at time T=2R/c in the example of FIG. 1.

For this purpose, as represented in FIG. 2, an incident wave corresponding to a pulse signal is sent from each transducer no. i of the assembly 3 (of abscissa $x_i$) during an emitting step (a) and the wave backscattered (reverberated) by the medium after this incident wave is emitted is recorded by each transducer no. j (of abscissa $x_j$) during a measuring step (b). During this operation, each transducer j captures a time signal $h_{ij}(t)$ following an emission by transducer i. This is done for all possible emitter/receiver pairs of the assembly 3, meaning in practice for all pairs of transducers 4.

The set of $N^2$ responses forms a temporal matrix of inter-element response $H(t)=[h_{ij}(t)]$, a square matrix of size N*N, which is the overall response of the medium 1. One will note that the temporal matrix of inter-element response $H(t)$ may possibly be acquired more rapidly, without each transducer i of the assembly 3 successively emitting a pulse signal, by proceeding for example as disclosed in document WO-A-2004/086557.

The signals $h_{ij}(t)$ are digitized (for example in 9 bits, or similar), sampled (for example with sampling at 20 MHz for ultrasound waves), and stored by the central processing unit 5.

The central processing unit 5 then carries out a processing step (c), comprising an initial substep (c1) of windowed transfer matrix determination.

During this substep (c1), each impulse response $h_{ij}(t)$ is first truncated (windowed) into successive time windows of duration $\Delta t$.

A series of windowed temporal matrices $K(T,t)=[k_{ij}(T,t)]$ is thus obtained of size N*N, where $k_{ij}(T,t)$ is the contribution at $h_{ij}(t)$ corresponding to the time window $[T-\Delta t/2;T+\Delta t/2]$, which is:

$$k_{ij}(T,t)=h_{ij}(t)\cdot W_R(t-T) \quad (1)$$

with:
- $W_R(t)=1$ for $t.-Dt/2;+Dt/2]$ and $W_R(t)=0$ everywhere else,
- $R=c.T/2$ is a distance measured from the assembly of transducers (see FIG. 2), along an axis z perpendicular to the longitudinal direction x of said assembly of transducers (constituting a linear array in the example considered here),
- c is the speed of the wave in the medium 1 (in the specific case of ultrasound in water or in soft tissue of the human body, c=1.5 mm/µs),
- $\Delta t$ is a predetermined duration corresponding to a distance $\Delta R=c.\Delta t$ traveled by the wave, the abovementioned time intervals $[T-\Delta t/2;T+\Delta t/2]$ advantageously being contiguous, meaning that they entirely cover a defined period of time (in other words, the processing performed covers a depth of field, meaning a range of values of R which is also continuous).

During substep (c1), a discrete Fourier transform of the coefficients of matrix $K(T,t)$ is performed in order to obtain for each value of T a transfer matrix of size N*N which we will call a windowed frequency transfer matrix $K(T,f)=[k_{ij}(T,f)]$, where $k_{ij}(T,f)$ is the discrete Fourier transform of $k_{ij}(T,t)$ and f is the frequency.

Based on these windowed frequency transfer matrices $K(T,f)$, the simple- and multiple-scattering contributions can be separated by filtering during a subsequent filtering substep (c3) which is part of the processing step (c).

In particular, during this subsequent filtering substep (c3), the multiple-scattering component can be separated from the simple-scattering component in each windowed frequency transfer matrix $K(T,f)$ on the basis of the coherence of coefficients $k_{ij}(T,f)$ of the windowed frequency domain transfer matrix $K(T,f)$ on each antidiagonal of said windowed frequency transfer matrix $K(T,f)$ (antidiagonal being used to refer to an alignment of coefficients $k_{ij}(T,f)$ of said matrix, such that i+j is constant).

In effect, simply scattered waves have a particular coherence along the antidiagonals of the matrix $K(T,f)$ while multiply scattered waves have a random aspect and do not exhibit a preferred coherence direction in said matrix $K(T,f)$. By carefully filtering these antidiagonals, the two contributions can thus be separated.

This property can be explained as follows.

Each of the impulse responses h (t) can be decomposed into the following form:

$$h_{ij}(t)=h_{ij}^S(t)+h_{ij}^M(t) \quad (2)$$

where $h_{ij}^S(t)$ and $h_{ij}^M(t)$ respectively correspond to the signals originating from simple scattering (S) and multiple scattering (M).

Similarly, the coefficients $k_{ij}(T,f)$ of the windowed frequency transfer matrix $K(T,f)$ can each be decomposed into the form $k_{ij}(T,f)=k_{ij}^S(T,f)+k_{ij}^M(T,f)$, where $k_{ij}^S(T,f)$ is the simple-scattering contribution and $k_{ij}^M(T,f)$ is the multiple-scattering contribution.

Each contribution $k_{ij}^S(T,f)$ can be considered as the sum of partial waves associated with several simple-scattering paths of which two examples (paths $d_1$ and $d_2$) are shown in FIG. 2. Simply scattered waves that reach the sensor array within the time window $[T-\Delta t/2; T+\Delta t/2]$ correspond to reflection of the initial wave on scatterers located in a region of the medium of thickness $DR=c.Dt$, at depth $R=cT/2$.

We use the term "isochronous volume" to denote the set of points which, at a given moment T, contribute to the signal captured in the array. In reality, the isochronous volume is not exactly a slice parallel to the array surface but results from the superposition of ellipses whose foci are the emitter element (i) and the receiver element (j). In far field, meaning when R is sufficiently large, the isochronous volume is similar to a slice of thickness DR parallel to the array and at a distance therefrom of $R=cT/2$.

The response $k_{ij}^S$ between elements i and j can be broken down into a sum of partial waves resulting from reflection on the $N_d$ scatterers of the isochronous volume. In two dimensions, in a context of paraxial approximation, we can write $k_{ij}^S(T,f)$ as follows:

$$k_{ij}^S(T,f) = \frac{\exp(2jkR)}{R}\sum_{d=1}^{N_d} A_d \exp\left\{j\frac{k}{2R}[(x_i-X_d)^2+(x_j-X_d)^2]\right\} \quad (3)$$

where the integer d denotes the $d^{th}$ simple-scattering path contributing to the signal received at time T, $X_d$ is the transverse position of scatterer d (along axis X), k is the wavenumber in the surrounding medium ($k=2\pi/\lambda$, $\lambda$ being the wavelength), and $A_d$ is an amplitude characterizing the reflectivity of scatterer d.

One will note that in the above equation (3) and in the other equations of the present patent application, j is the imaginary number such that $j^2=-1$ when it is not a subscript, but denotes the position of a matrix element when it is a subscript.

Figure 3:
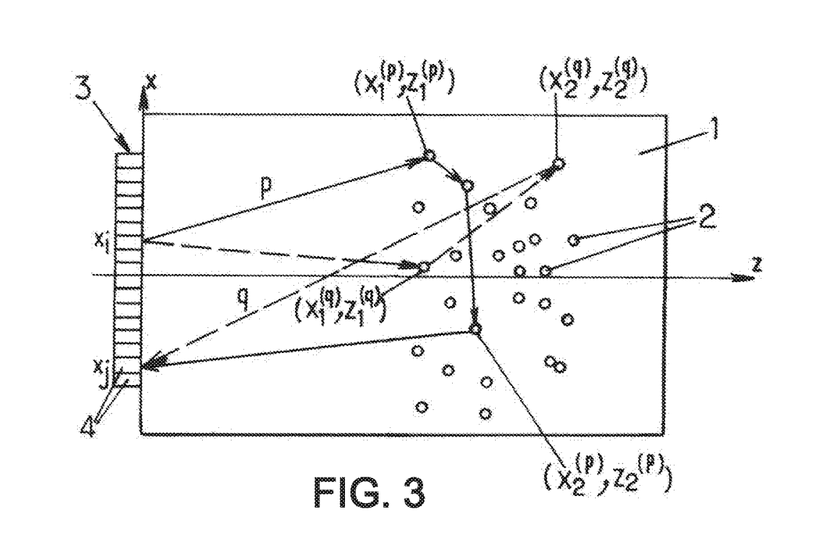
FIG. 3 is a diagram representing two multiple-scattering paths contributing to the field backscattered by the probed medium at time T=2R/c in the example of FIG. 1, FIGS. 4 and 5 illustrate a data rotation substep that is part of an embodiment of the method according to the prior art, in which two matrices A1 and A2 are extracted from each windowed frequency transfer matrix K.

The multiple-scattering contribution can also be broken down into partial waves corresponding to multiple-scattering paths of a length comprised within the interval [R−DR/2; R+DR/2], as represented in FIG. 3 (for two paths of indices p and q).

We can write $K_{ij}^M(T,f)$ as follows:

$$k_{ij}^M(T,f) = \sum_{p=1}^{N_p} \frac{\exp[jk(Z_1^{(p)} + Z_2^{(p)})]}{\sqrt{Z_1^{(p)}Z_2^{(p)}}}$$

$$B_p \exp\left\{j\frac{k}{2Z_1^{(p)}}(x_i - X_1^{(p)})^2\right\}\exp\left\{j\frac{k}{2Z_2^{(p)}}(x_j - X_2^{(p)})^2\right\}$$

where the integer p denotes the index of the multiple-scattering path concerned. The pairs $(X_1^{(p)}, Z_1^{(p)})$ and $(X_2^{(p)}, Z_2^{(p)})$ respectively denote the coordinates of the first and last scatterer of path p in the example represented in FIG. 3. $B_p$ corresponds to the complex amplitude of the partial wave related to path p, from the first scattering event $(X_1^{(p)}, Z_1^{(p)})$ to the last $(X_2^{(p)}, Z_2^{(p)})$.

Although the distribution of the scatterers 2 in the medium 1 is completely random and without correlation between scatterers, the signal associated with simple scattering $k_{ij}^S$ has a particular coherence, unlike the multiple-scattering contribution. In effect, equation (3) can be rewritten as follows:

$$k_{ij}^S(T,f) = \tag{5}$$

$$\underbrace{\frac{\exp(2jkR)}{R}\exp\left\{j\frac{k}{4R}(x_i - x_j)^2\right\}}_{\text{deterministic contribution}} \cdot \underbrace{\sum_{d=1}^{N_d} A_d \exp\left\{j\frac{k}{4R}[(x_i + x_j - 2X_d)^2]\right\}}_{\text{random contribution}}$$

The term appearing in front of the sum of equation (5) is independent of the exact distribution of the scatterers, and is therefore a deterministic contribution, which characterizes simple scattering. The right term is random, because it is explicitly dependent on the position of the scatterers.

In contrast, the signal related to multiple scattering (Equation 4) cannot be written this way.

Figure 4:
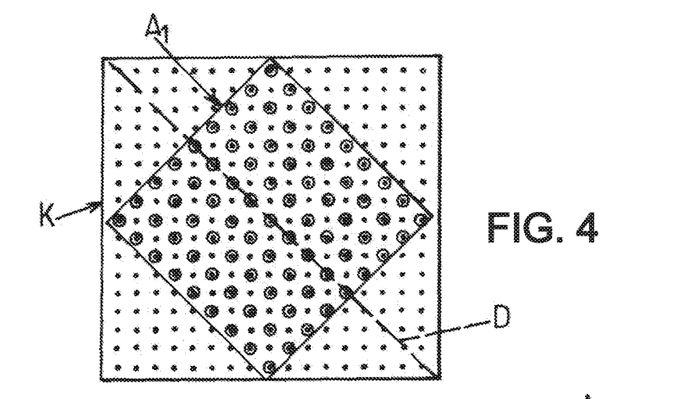

This property of signals originating from simple scattering is expressed as a particular coherence along the antidiagonals of each matrix K(T,f), as illustrated in FIG. 4. In fact, along each antidiagonal, meaning for the emitter(i)/receiver(j) pairs where i+j=constant, the random contribution of $k_{ij}^S$ is constant. For a given scattering medium, in simple scattering, there therefore exists a deterministic phase relation between the coefficients of each matrix K(T,f) located on the same antidiagonal.

However, in multiple scattering, this property is no longer satisfied and matrix K(T,f) has no particular coherence: elements $k_{ij}^M$ are independent of one another.

The present method exploits this property in order to isolate the simple- and multiple-scattering contributions by filtering based on experimentally measured signals, making use of the particular symmetry of the simple-scattering contribution within each matrix K(T,f). One can thus filter out:
  the simple-scattering component $k^S_{ij}(T,f)$ of each coefficient $k_{ij}(T,f)$ of the matrix K(T,f), such that the simple-scattering components $k^S_{ij}(T,f)$ are mutually coherent on each antidiagonal of said matrix K(T,f),
  and the multiple-scattering component $k^M_{ij}(T,f)$ of each coefficient $k_{ij}(T,f)$ of matrix K(T,f), such that the components $k^M_{ij}(T,f)$ are random and not correlated with each other.

Two example filtering techniques which can be used to separate the two contributions are presented below.

In these two techniques, the processing step (c) comprises the following two substeps, after the windowed transfer matrix determination substep (c1):
  a data rotation substep (c2), by rotating data of each matrix K(T,f) and creating two sub-matrices $A_1(T,f)$ and $A_2(T,f)$,
  the abovementioned filtering substep (c3), during which matrices $A_1$ and $A_2$ are filtered, in particular by projection (technique 1) or by singular-value decomposition (technique 2), thus obtaining two filtered matrices denoted $A_1^F$ and $A_2^F$,
  a reverse data rotation substep (c4) which allows reconstructing, from $A_1^F$ and $A_2^F$, filtered transfer matrices $K^F(T,f)$ containing either the simple-scattering contribution or the multiple-scattering contribution, depending on the type of filtering applied.

These substeps (c2) to (c4) are detailed below.

Substep (c2): Data Rotation

In this substep (c2), the central processing unit 5 calculates two matrices $A1(T,f)=[a1_{uv}(T,f)]$ and $A2=[a2_{uv}(T,f)]$ from each matrix K(T,f), where:
$a1_{uv}(T,f) = k_{u+v-1,\, v-u+2M-1}(T,f)$,
$a2_{uv}(T,f) = k_{u+v,\, v-u+2M-1}(T,f)$,
$M = (N+3)/4$.

N is selected so that M is an integer: for example, N=125 and M=32. If the total number of transducers 3 is such that M is not an integer, we work with a reduced number N of transducers, such that M=(N+3)/4 is an integer (in the specific example considered here, we can for example use an array of 128 transducers and work with only N=125 of them).

Matrices A1 and A2 are square matrices composed of subsets of matrix K(T,f) which are rotated 45° in the counterclockwise direction. These matrices A1 and A2 are respectively illustrated in FIGS. 4 and 5, which are to be understood as follows:
  A1 is a square matrix of size (2M−1)·(2M−1) in which the rows are composed of certain diagonals in matrix K(T,f) (every other one), comprising the coefficients of matrix K(T,f) which are circled in FIG. 4 (the coefficients of K(T,f) are indicated by dots in FIGS. 4 and 5),
  A2 is a square matrix of size (2M−2)·(2M−2) in which the rows are composed of the other diagonals in matrix K(T,f), comprising the coefficients of matrix K(T,f) which are circled in FIG. 5.

In the following, we will use $Ar=[ar_{ij}]$ to refer to matrices A1 and A2 (r=1 or 2) and we will use L to refer to the size of matrix Ar (for matrix A1, we therefore have L=2M−1, and for matrix A2, L=2M−2).

Due to spatial reciprocity, matrix K is symmetric with respect to its main diagonal D ($k_{ij}=k_{ji}$). Matrix Ar therefore also has symmetry: each row of its upper portion is identical to a row in the lower portion, symmetric with respect to a horizontal center line corresponding to the main diagonal D. The upper portion of matrix Ar can therefore be directly deduced from the lower portion. Thus, each column of matrix A1 only contains M independent coefficients although it is of size L>M, and each column of matrix A2 contains M−1 independent coefficients. More generally, the number of independent coefficients of matrix Ar is therefore a number Mr such that Mr=M if r=1, and Mr=M−1 if r=2.

Substep (c3): Filtering

During the filtering substep (c3), the central processing unit 5 separates the multiple-scattering component from the simple-scattering component in each of the matrices Ar, r being an index equal to 1 or 2, and we thus obtain at least two filtered matrices $Ar^F$ respectively corresponding to the two matrices Ar and each representative of either the simple-scattering component or the multiple-scattering component.

This filtering may be performed in particular according to the abovementioned technique 1 or according to technique 2.

1. Technique 1: Projection Filtering

In this first technique, during the filtering substep (c3), the central processing unit 5 calculates two filtered matrices $Ar^F$ which are representative of simple scattering.

Each of these filtered matrices is calculated by the formula:

$$Ar^F = S\,{}^tS^*\,Ar, \text{ where:}$$

$S=[s_u]$ is a column vector, ${}^tS^*$ being the transpose of the conjugate vector of vector S, the components $s_u$ of vector S are complex numbers equal to:

$$s_u = s \cdot \exp\left\{j\frac{k}{2R}y_u^2\right\}\bigg/\sqrt{L},$$

s is a constant, in practice equal to 1 (and therefore not mentioned below), $y_u = (x_i - x_j)/\sqrt{2}$, where u=(i−j)/2+M if r=1 and u=(i−j−1)/2+M if r=2, $x_i$ and $x_j$ are the abscissas of the transducers of indices i and j along an axis X, the assembly of transducers extending at least along said axis X, L=2M−1 for r=1 and L=2M−2 for r=2.

This formula is justified as follows.

Each matrix Ar is the sum of two terms, $Ar^S$ and $Ar^M$, respectively denoting the contributions due to simple scattering and multiple scattering:

$$Ar = Ar^S + Ar^M \qquad (6)$$

The data rotation, in other words the transition from K(T,f) to Ar, is mathematically expressed by the change of coordinates $(x_i,x_j)$ fi $(y_u,y_v)$:

$$y_u=(x_i-x_j)/\sqrt{2} \text{ and } y_v=(x_i+x_j)/\sqrt{2}$$

Equation (5) is then rewritten on this new basis:

$$ar_{uv}^S(T,f) = \underbrace{\frac{\exp(2jkR)}{R}\exp\left\{j\frac{k}{2R}y_u^2\right\}}_{\text{deterministic contribution}} \cdot \underbrace{\frac{G_v}{\text{random contribution}}}_{} \qquad (7)$$

where $$G_v = \sum_{d=1}^{N_d} A_d \exp\left\{j\frac{k}{2R}\left[\left(y_v - \sqrt{2}\,X_d\right)^2\right]\right\}.$$

Thus for a given medium 1, each column of matrix $Ar^S$ has a fully determined dependency on the index of the rows (u).

However, the multiple-scattering contribution (Equation 4) cannot be factored so simply. Even after rotation of the matrix, the randomness of the position of the scatterers persists in the columns as well as in the rows of matrix $Ar^M$.

Filtering of simply scattered signals can therefore be done by projecting the columns of the complete matrix Ar into the "characteristic space of simple scattering" generated by vector S of coordinates:

$$s_u = \exp\left\{j\frac{k}{2R}y_u^2\right\}\bigg/\sqrt{L}. \qquad (8)$$

The presence of $\sqrt{L}$ in the denominator ensures normalization of vector S. The row vector P resulting from this projection is written:

$$P = {}^tS^* \cdot Ar \qquad (9),$$

where ${}^tS^*$ is the conjugate transpose of vector S.

The coordinates of vector P are given by:

$$p_v = \qquad (10)$$

$$\sum_u s_u^* a_{uv} = \sum_u s_u^* a_{uv}^S + \sum_u s_u^* a_{uv}^M = \sqrt{L}\,\frac{\exp(2jkR)}{R}G_v + \sum_u s_u^* a_{uv}^M$$

The residual term $$\sum_u s_u^* a_{uv}^M$$

corresponds to the projection of multiply scattered signals on vector S.

Next, the filtered matrix $Ar^F$ is obtained by multiplying the column vector S by the row vector P:

$$Ar^F = SP = S \cdot {}^tS^* \cdot A \qquad (11)$$

The coordinates of matrix $Ar^F$ are then written:

$$ar_{uv}^F = s_u p_v = \frac{\exp(2jkR)}{R}\exp\left\{j\frac{k}{2R}y_u^2\right\}G_v + s_u\sum_{u'} s_{u'}^* a_{u'v}^M \qquad (12)$$

The first term is strictly equal to the simply scattered component (Equation 7). We therefore have:

$$a_{uv}^F = a_{uv}^S + s_u \sum_{u'} s_{u'}^* a_{u'v}^M \qquad (13)$$

In terms of matrices, equation (13) is rewritten as follows:

$$Ar^F = \underbrace{Ar^S}_{\text{simple scattering}} + \underbrace{S \cdot {}^tS^* \cdot A^M}_{\text{residual noise}} \qquad (14)$$

Matrix $Ar^F$ does indeed contain the contribution related to simple scattering ($A^S$), but it also contains a residual term related to the presence of multiple scattering ($S\,{}^tS^*A^M$). The persistence of this term is due to the fact that the multiple-scattering signals are not strictly orthogonal to the characteristic space of simple scattering, generated by vector S.

The filtering achieved is therefore not perfect; the extent of the residual noise can be assessed, however.

Indeed, as noted in the paragraph concerning data rotation, each column in matrix A1 only has M independent coefficients and matrix A2 only M−1 independent coefficients; the contribution from multiple scattering is therefore decreased by a factor $\sqrt{Mr}$ after filtering. As the simple-scattering contribution remains unchanged, the signal-to-noise ratio or more specifically the "simple scattering/multiple scattering" ratio is therefore on the order of $\sqrt{Mr}$.

The filtering technique described above (technique 1) is to be used in particular when one wishes to extract a simple-scattering contribution obscured by the multiple scattering, meaning in the case of media where the simply scattered signals are of very low amplitude compared to the signals from multiple scattering. This particularly applies to the case of detecting targets buried in a scattering medium.

2. Technique 2: Filtering by Singular Value Decomposition

This second technique consists of separating simple scattering and multiple scattering by performing singular value decomposition (SVD) of the matrices $A_1$ and $A_2$ obtained after rotation. SVD has the property of factoring a matrix into two subspaces: a "signal space" (matrix characterized by a significant correlation between rows and/or columns of the matrix) and a "noise space" (random matrix without correlation between elements). By applying SVD to the matrices Ar obtained after rotation, the signal space corresponds to matrix $Ar^S$ (simple-scattering contribution, characterized by a high correlation along its columns) and the noise space is associated with matrix Arm (multiple-scattering contribution), where $Ar=Ar^S+Ar^M$ (Equation 6 already described in the paragraph concerning technique 1).

The SVD of the matrices Ar is written as follows:

$$Ar = U\Lambda^t V^* = \sum_{i=1}^{L} l_i U_i^t V_i^* \quad (15)$$

where U and V are unitary square matrices of size L. Their respective columns $U_i$ and $V_i$ correspond to the eigenvectors associated with the singular value $l_{i,r}$. L is a square diagonal matrix of dimension L whose diagonal elements correspond to the singular values $l_{i,r}$ arranged in descending order. In the paragraph concerning data rotation, a particular symmetry of matrix Ar was highlighted: this matrix only comprises Mr independent rows, and is therefore of rank Mr<L. Matrix Ar therefore only has Mr non-zero singular values and equation (15) is rewritten as:

$$Ar = U\Lambda^t V^* = \sum_{i=1}^{Mr} l_i U_i^t V_i^* \quad (16)$$

As simple scattering is characterized, after data rotation, by great coherence along the columns of the matrices Ar, SVD reveals this contribution in the signal space (the simple-scattering contribution will be associated with the highest singular values) while the multiple-scattering contribution will be associated with the lowest singular values. Here, unlike in the first filtering technique, there is no a priori hypothesis on the form of the existing coherence on the antidiagonals of matrix K(T,f) in the case of simple scattering: it is simply assumed that this coherence exists.

The problem is to determine to what rank of singular value corresponds the threshold separating the "signal" space (associated with simple scattering) from the "noise" space (associated with multiple scattering). If equation (5) were strictly accurate, only the first singular values would correspond to the signal space. When the assumptions leading to equation (5) are not strictly accurate, the simple-scattering contribution is not of rank 1 and several singular values bear traces of this contribution. A criterion must then be established for separation between the simple-scattering contributions (signal space) and multiple-scattering contributions (noise space).

To do this, we use results from random matrix theory. By convention and for simplification, the singular values $\lambda_{i,r}$ are normalized by their root mean square:

$$\tilde{l}_{i,r} = \frac{l_{i,r}}{\sqrt{\frac{1}{Mr+1-i}\sum_{m=i}^{Mr} l_{m,r}^2}} \quad (17)$$

For a large matrix in which the coefficients are completely random, with no correlation between them, the first singular value $\tilde{l}_1$ never exceeds a value $\tilde{l}_{max}$ ($\tilde{l}_{max}=2$ in the case of a square matrix).

Experimentally, the multiple-scattering contribution does not exactly correspond to a completely random matrix, because residual correlations exist between sensors (in particular due to mechanical or electrical coupling between adjacent transducers in the assembly 3), which modifies $\tilde{l}_{max}$. Based on [A. M. Sengupta and P. P. Mitra, "*Distributions of singular values for some random matrices*," Phys. Rev. E, Vol. 60(3), pp 3389-3392, 1999.], one can establish the new law of probability for the singular values of such a matrix and use this to determine the value of $\tilde{l}_{max}$ which will allow defining an objective criterion for separation between the signal space and noise space.

After rotation of the experimental data, the matrix Ar to be processed (see equation 6) is therefore the sum of a matrix $Ar^S$ of rank p<M associated with simple scattering and a matrix $Ar^M$ of rank M associated with multiple scattering which one wishes to filter.

The proposed technique is as follows: after having performed SVD, the central processing unit 5 considers the first singular value $\tilde{l}_{1,r}$ after normalization. If this value is greater than $\tilde{l}_{max}$, this means that the first eigenspace is associated with simple scattering.

The process is then repeated at rank 2 and at higher ranks if necessary.

Figure 7:
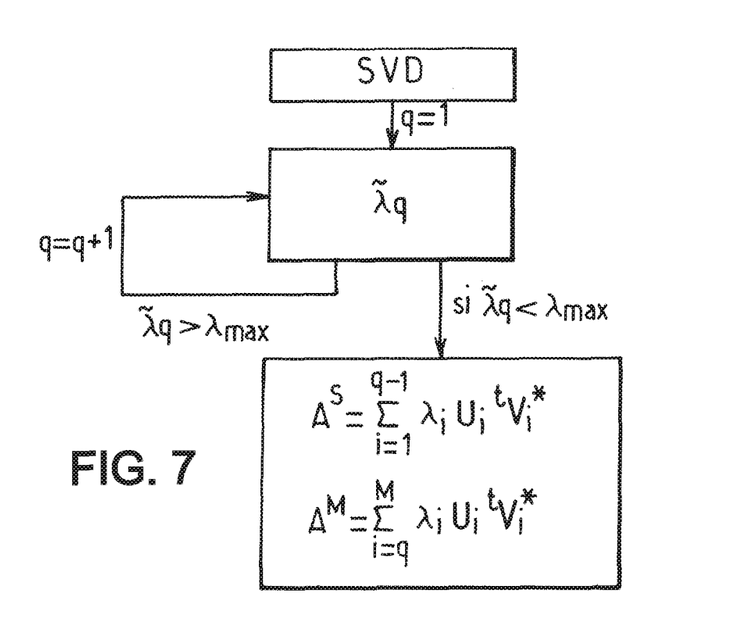
FIG. 7 illustrates an iterative process usable for filtering arrays A1 and A2 by singular-value decomposition.

As represented in FIG. 7, the processing performed by the central processing unit 5 is therefore iterative processing which comprises the following substeps:

(c31) q is initialized to 1, (c32) a normalized singular value is calculated using $\lambda_{q,r}$:

$$\tilde{l}_{q,r} = \frac{l_{q,r}}{\sqrt{\frac{1}{Mr+1-q}\sum_{m=q}^{Mr} l_{m,r}^2}},$$

(c33) if $\tilde{l}_{q,r}$ is at least equal to a predetermined threshold value $\tilde{l}_{max}$, $\tilde{l}_{q,r}$ is attributed to simple scattering and substep (c32) is repeated after incrementing q by one, (c34) if $\tilde{l}_{q,r}$ is less than the threshold value $\tilde{l}_{max}$, $\tilde{l}_{q,r}$ and any subsequent singular values are attributed to multiple scattering.

If the rank for which $\tilde{l}_{p+1,r} < \tilde{l}_{max}$ is referred to as p+1, one thus obtains:

$$Ar^S = \sum_{i=1}^{p} l_{i,r} U_i^t V_i^* \quad (19)$$

$$Ar^M = \sum_{i=p+1}^{Mr} l_{i,r} U_i^t V_i^* \quad (20)$$

Matrix $Ar^S$ then contains the simple-scattering contribution (plus a residual multiple-scattering contribution) and matrix $Ar^M$ is associated with multiple scattering.

Note that technique 2 assumes that the first of the normalized singular values exceeds the threshold $\tilde{l}_{max}$. It cannot be used in highly scattering media, meaning media for which the multiple-scattering contribution is predominant relative to simple scattering. In this case, the technique of filtering by projection of antidiagonals onto the simple-scattering space is used instead (technique 1) in order to extract the simple-scattering contribution. Conversely, if the simple-scattering contribution is predominant or on the same order of magnitude as multiple scattering, one can use the technique of SVD filtering of the matrices A (technique 2) and thus extract the multiple-scattering contribution.

Substep (c4): Reverse Data Rotation

During the reverse data rotation substep (c4), the central processing unit 5 performs a reverse transformation of the transformation described in substep (c1), and thus calculates a filtered windowed transfer matrix $K^F(T,f) = [k^F_{ij}(T,f)]$, where:

when i−j is even: $k^F_{ij}(T,f) = a1^F_{(i−j)/2+M, (i+j)/2}$,
when i−j is odd: $k^F_{ij}(T,f) = a2^F_{(i−j−1)/2+M, (i−j−1)/2}$.

Figure 6:
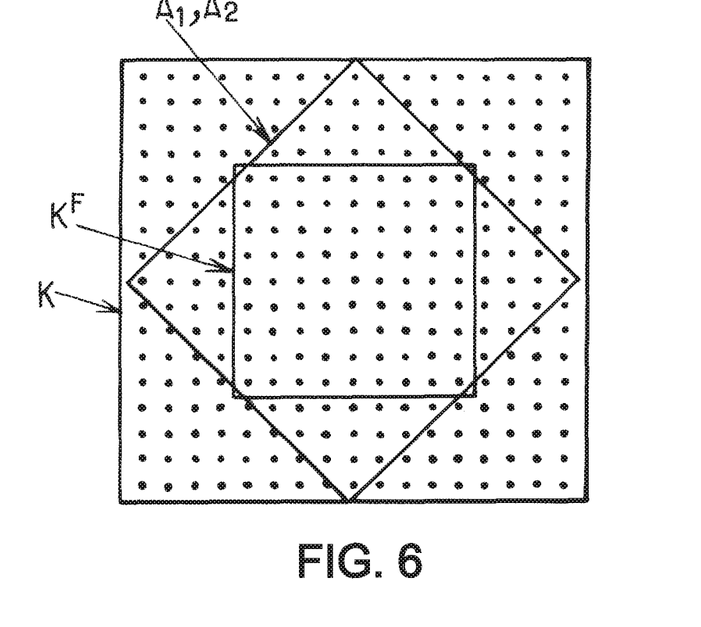
FIG. 6 illustrates a reverse data rotation substep during which a filtered transfer matrix $K^F$ is determined from the abovementioned matrices A1 and A2, after filtering of said matrices.

Matrix $K^F(T,f)$ is a square matrix of size (2M−1). (2M−1), containing signals which originate either from simple scattering or multiple scattering, depending on the type of filtering applied. The reverse data rotation procedure is illustrated in FIG. 6, which shows that matrix $K^F(T,f)$ includes some of the coefficients of the antidiagonals of matrices A1(T,f) and A2(T,f).

The filtered matrices $K^F(T,f)$ can then be used in various ways:

if $K^F(T,f)$ corresponds to the simple-scattering component, it can be used in particular to detect a singular point of the medium 1 or to construct an image of the medium 1. For this purpose, two imaging methods can be used for example:

In a first imaging method, the central processing unit 5 can for example calculate from each matrix $K^F(T,f)$, by inverse Fourier transform, a filtered windowed temporal matrix of inter-element response $H^F(T,t)$, then can sum the different temporal matrices $H^F(T,t)$ to obtain a filtered temporal matrix of inter-element response $H^F(t)$, representative of the responses between transducers of the transducer assembly. The central processing unit then creates the image of the medium by forming paths based on said filtered temporal matrix of inter-element response $H^F(t)$.

In a second imaging method, called the decomposition of time reversal operator method ("DORT method", defined by Prada et al., «*Eigenmodes of the time reversal operator: a solution to selective focusing in multiple-target media*», Wave Motion 20 (1994) 151-163, Elsevier Science B.V.), the central processing unit 5 can perform the following steps:

(d1) determine, for each filtered transfer matrix $K^F(T,f)$, a time reversal operator $ORT(T,f) = K^{F*}(T,f) K^F(T,f)$ corresponding to the or to each transfer matrix $K^F(T,f)$, $K^{F*}(T,f)$ being the complex conjugate matrix of $K^F(T,f)$, (d2) determine at least some eigenvectors and/or eigenvalues of said time reversal operator, (d3) detect at least one singularity in the medium as a function of at least said eigenvectors and/or said eigenvalues. During this step (d3), one can determine eigenvectors Vi(f) of the time reversal operator, then numerically propagate these eigenvectors in a digital model of the medium 1, in order to determine a position of an object reverberating in the medium 1 corresponding to each eigenvector, if the matrices $K^F(T,f)$ correspond to the multiple-scattering component, they can be used in particular to calculate, from said multiple-scattering component, an index representative of the significance of the multiple scattering in the medium. In this case, one can for example create an image (ultrasound or other) of the medium by any known means or by the above methods, and quantify the reliability of said image as a function of said index representative of the significance of the multiple scattering. Advantageously, one can calculate this index at multiple points (in particular at various depths R) and quantify the reliability of multiple portions of the image corresponding to said multiple points, as a function of said index representative of the significance of the multiple scattering.

The method of the present invention improves the method described above.

In particular, the loss of information from the matrices during the steps of data rotation (c2) and reverse data rotation (c4) is avoided.

Figure 5:
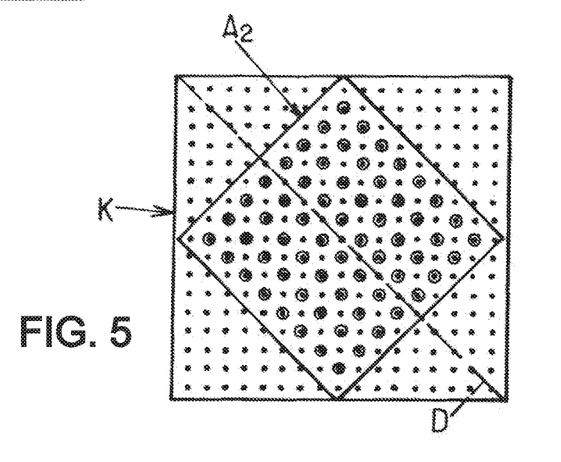

In fact, as is represented in FIGS. 4 to 5, the data rotation step (c2) of the prior art does not use the corners of the windowed frequency transfer matrix K(T,f) when constructing the two matrices A1(T,f) and A2(T,f), so that a large portion of the data of the windowed frequency transfer matrix K(T,f) is lost for the rest of the calculations of the method. The four corners K1, K2, K3, K4 of this windowed frequency transfer matrix are not used to construct matrix A1 (see FIG. 4) or to construct matrix A2 (see FIG. 5). This data rotation step therefore excludes substantially half the data of the windowed frequency transfer matrix.

According to a first embodiment of the method according to the invention, the data rotation substep (c2) comprises:

a first substep (c21) during which the windowed frequency transfer matrix K(T,f) is introduced (preferably at the center) into an extended matrix Ke(T,f) of larger size, all elements of said extended matrix Ke aside from those coming from the windowed frequency transfer matrix K(T,f) being zero, and a second substep (c22) (similar to the data rotation substep of the prior art) during which two matrices $A1(T,f) = [a1_{uv}(T,f)]$ and $A2 = [a2_{uv}(T,f)]$ are calculated from the extended matrix Ke(T,f), by extraction from the extended matrix Ke(T,f) of submatrices rotated by 45° in a first direction.

The size of the extended matrix Ke is adapted so that the elements from the windowed frequency transfer matrix are all included in a square Ker tilted by 45° and itself included in the extended matrix Ke. In particular, the size of the extended matrix Ke is greater than or equal to 2×N−1.

Figure 8:
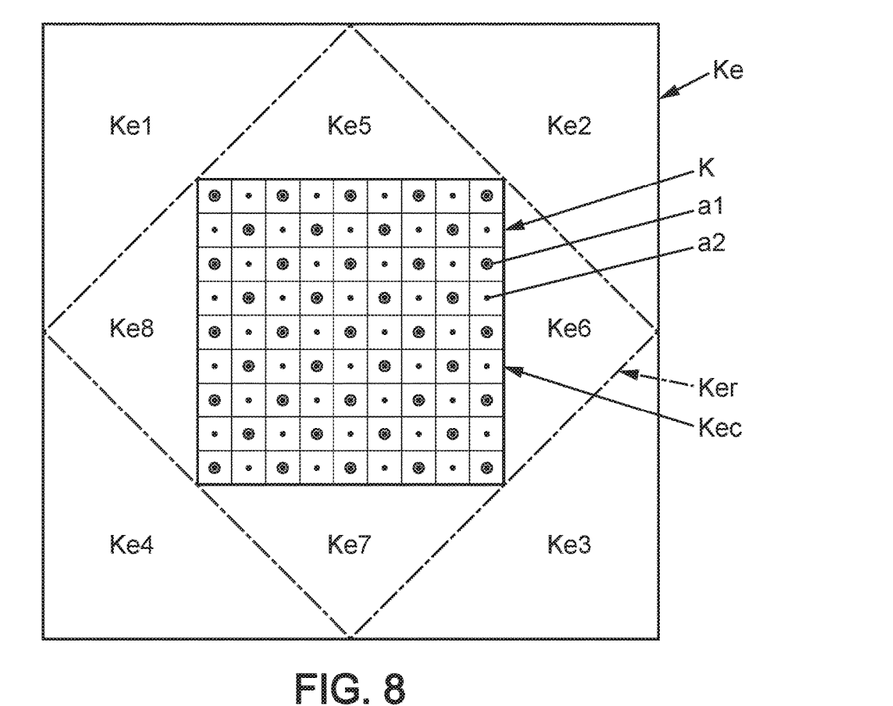
FIG. 8 illustrates an exemplary extended matrix Ke according to a first embodiment of the invention.

FIG. 8 shows an example in which the windowed frequency transfer matrix K(T,f) is of size 9×9 (N=9), and this matrix is introduced into the center of the larger extended matrix Ke. The extended matrix then has a size of 17×17.

The extended matrix Ke then comprises corner portions Ke1, Ke2, Ke3, Ke4, side portions Ke5, Ke6, Ke7, Ke8, and a central portion Kec. The side portions are also corners of the square Ker. All elements of the extended matrix Ke aside from the central portion Kec (which contains the elements of the windowed frequency transfer matrix K(T,f)), are zero. In other words, all elements of the corner portions Ke1, Ke2, Ke3, Ke4 and side portions Ke5, Ke6, Ke7, Ke8 are zero.

The square Ker serves as a basis for forming matrices A1 and A2 of the second substep by taking every other element from the extended matrix Ke, as explained below.

For example, if N is odd, in the first substep (c21) the size of the extended matrix is 2×N−1, and the extended matrix Ke is defined by Ke(T,f)=[$ke_{ij}$(T,f)] based on matrix K(T,f), using the following relations or any other equivalent formulas:

if i, [1+(N−1)/2; N+(N−1)/2], and
j, [1+(N−1)/2; N+(N−1)/2]
then $ke_{ij}$(T,f)=$k_{i-(N-1)/2, j-(N-1)/2}$(T,f),
else $ke_{ij}$(T,f)=0.

Equivalent formulas can be established for N being even.

Then, during the second step (c22), the two matrices A1(T,f)=[$a1_{uv}$(T,f)] and A2=[$a2_{uv}$(T,f)] are calculated from the extended matrix Ke(T,f)=[$ke_{ij}$(T,f)].

In the case presented in FIG. 8, matrix A1 will have a size of 9×9, and matrix A2 will have a size of 8×8.

In fact, matrix A1 has a size identical to that of the windowed frequency transfer matrix K(T,f), meaning a size equal to N×N, and matrix A2 has a size equal to that of the windowed frequency transfer matrix K(T,f) minus one, meaning a size equal to (N−1)×(N−1).

Figure 9:
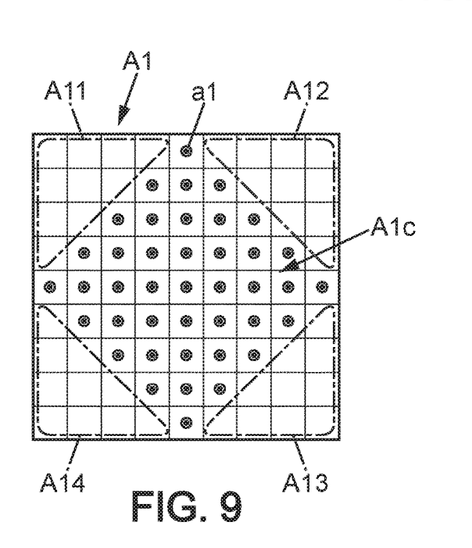
FIGS. 9 and 10 show the two matrices A1 and A2 obtained from the extended matrix of the first embodiment of FIG. 8, or obtained directly according to a second embodiment of the invention from the windowed frequency transfer matrix K.

FIG. 9 shows matrix A1 extracted from the extended matrix Ke of FIG. 8. This matrix A1 takes the elements represented by the large dots, rotating them 45° in a first direction (counterclockwise) and placing them in a central portion A1c of matrix A1. The element denoted a1 in the extended matrix Ke of FIG. 8 is also denoted a1 in the matrix A1 of FIG. 9 in order to show the displacements of the elements between the extended matrix Ke and matrix A1. The elements of the corner portions A11, A12, A13, and A14 of matrix A1 respectively come from the side portions Ke5, Ke6, Ke7, and Ke8, and are all zero.

Figure 10:
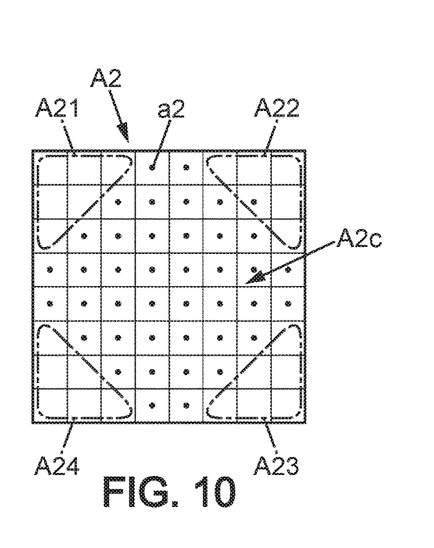

FIG. 10 shows matrix A2 extracted from the extended matrix Ke of FIG. 8. This matrix A2 takes the elements represented by the small dots, rotating them 45° in the first direction (counterclockwise) and placing them in a central portion A2c of matrix A2. The element denoted a2 in the extended matrix Ke of FIG. 8 is also denoted a2 in matrix A2 of FIG. 10 in order to show the displacements of elements between the extended matrix Ke and matrix A2. The elements of the corner portions A21, A22, A23, and A24 of matrix A2 respectively come from the side portions Ke5, Ke6, Ke7, and Ke8, and are all zero.

More specifically, if N is odd, during the second substep (c22), matrices A1(T,f) and A2(T,f))] are calculated from the extended matrix Ke(T,f)=[$ke_{ij}$(T,f)], by the following relations or any other equivalent formulas:

$a1_{uv}$(T,f)=$ke_{u+v-1, v-u+(N+3)/2-1+(N-1)/2}$(T,f), and
$a2_{uv}$(T,f)=$ke_{u+v, v-u+(N+3)/2-1+(N-1)/2}$(T,f).

Equivalent formulas can be established if N is even.

According to a second embodiment of the method according to the invention, the data rotation substep (c2) is performed directly (without constructing an extended matrix Ke).

For example, if N is an odd integer, the two matrices A1(T,f)=[$a1_{uv}$(T,f)] and A2=[$a2_{uv}$(T,f)] are calculated from the windowed frequency transfer matrix K(T,f)=[$k_{ij}$(T,f)], using the following relations or any equivalent formulas:

if u+v−1−(N−1)/2 and v−u+(N+3)/2−1 are both between 1 and N, inclusive,
then $a1_{uv}$(T,f)=$k_{u+v-1-(N-1)/2, v-u+(N+3)/2-1}$(T,f),
else $a1_{uv}$(T,f)=0, and
if u+v−(N−1)/2 and v−u+(N+3)/2−1 are both between 1 and N−1, inclusive,
then $a2_{uv}$(T,f)=$k_{u+v-(N-1)/2, v-u+(N+3)/2-1}$(T,f),
else $a2_{uv}$(T,f)=0.

Equivalent formulas can be established if N is even.

In the method of the invention, the filtering substep (c3) is for example identical to the filtering substep of the prior art. In particular, two filtered matrices $A1^F$ and $A2^F$ are calculated from matrices A1 and A2, for example either using the projection filtering technique described above, or using the singular value decomposition filtering technique described above, or by any other technique.

The filtered matrices $A1^F$ and $A2^F$ have the same size as the matrices A1 and A2 determined in the data rotation step (c2).

In particular, if N is odd, advantageously the filtered matrix $A1^F$ has a size of N×N and the filtered matrix $A2^F$ has a size of (N−1)×(N−1).

In addition, during the reverse data rotation substep (c4), a substantially inverse transformation of the transformation described for the data rotation substep (c2) is performed. In this substep, a filtered transfer matrix $K^F$(T,f)=[$k^F_{ij}$(T,f)] is calculated from the filtered matrices $A1^F$(T,f)=[$a1^F_{uv}$(T,f)] and $A2^F$=[$a2^F_{uv}$(T,f)] which were calculated during the preceding filtering substep (c3).

This substep is very similar or is identical to the reverse data rotation substep (c4) of the prior art described above. In this substep, the elements of the central portions of the filtered matrices $A1^F$ and $A2^F$ are included and arranged in the filtered transfer matrix $K^F$ by a rotation in a second direction that is the reverse of the first direction (45° rotation in the clockwise direction). The elements of the corner portions of the filtered matrices $A1^F$, $A2^F$ are not included in the filtered transfer matrix $K^F$. These elements are zero in any event, as are those of the corner portions of matrices A1 and A2.

For example, if N is an odd integer, the filtered transfer matrix $K^F$(T,f)=[$k^F_{ij}$(T,f)] is calculated based on two matrices $A1^F$(T,f)=[$a1^F_{uv}$(T,f)] and $A2^F$=[$a2^F_{uv}$(T,f)], by the following relations or any equivalent formulas:

if i−j is even,
then $k^F_{ij}$(T,f)=$a1^F_{(i-j)/2+(N+1)/2, (i+j)/2}$,
else $k^F_{ij}$(T,f)=$a2^F_{(i-j-1)/2+(N+1)/2, (i+j-1)/2}$.

Unlike the method of the prior art, the filtered windowed frequency transfer matrix $K^F$(T,f) then has a size of N×N, which is a size identical to the initial windowed frequency transfer matrix K(T,f).

In the method of the prior art (see FIG. 6), the filtered windowed frequency transfer matrix $K^F$(T,f) has a size of (N+1)/2×(N+1)/2. It contains a much lower number of elements: approximately four times fewer due to the elements lost during the data rotation substep (c2) of this prior art method.

With the method of the invention, the filtered windowed frequency transfer matrix $K^F$(T,f) contains a large number of elements, and it is possible to take into account a larger number of multiple scatterings. Therefore the medium can be probed by wave propagation to a larger depth. In addition, the images one wishes to produce of the medium will have better spatial resolution. It is possible to use an assembly 3 of transducers having a lower number of transducers, and the method and device will then be less costly.

In addition, in an advantageous embodiment, during the windowed transfer matrix determination substep (c1), each windowed frequency transfer matrix K(T,f) is determined by wavelet transform of the windowed temporal matrix K(T,t).

The wavelet transform of a temporal function $f$, over is defined by:

$$g(u, s) = \int_{-\infty}^{\infty} f(t).Y_{u,s}(t)^*.dt \text{ with } Y_{u,s}(t) = \frac{1}{\sqrt{s}}.Y\left(\frac{t-u}{s}\right)$$

where
y is a mother wavelet function,
$y_{u,s}$ is a wavelet of the wavelet family,
* denotes the complex conjugate,
u is the translation factor, and
s is the expansion factor.

A wavelet family therefore corresponds to a bank of frequency filters. This filter bank must contain the frequencies to be studied. Calculation of the wavelet transform is then equivalent to convolution of the impulse response of each filter with each time signal, impulse response $h_{ij}(t)$. The windowed temporal matrices K(T,t) are said impulse responses $h_{ij}(t)$ between transducers of the assembly of transducers, over a time window close to time T and of duration Dt. And the windowed frequency matrices K(T,f) are calculated by wavelet transform, for example by the convolutions defined above.

Figure 11A:
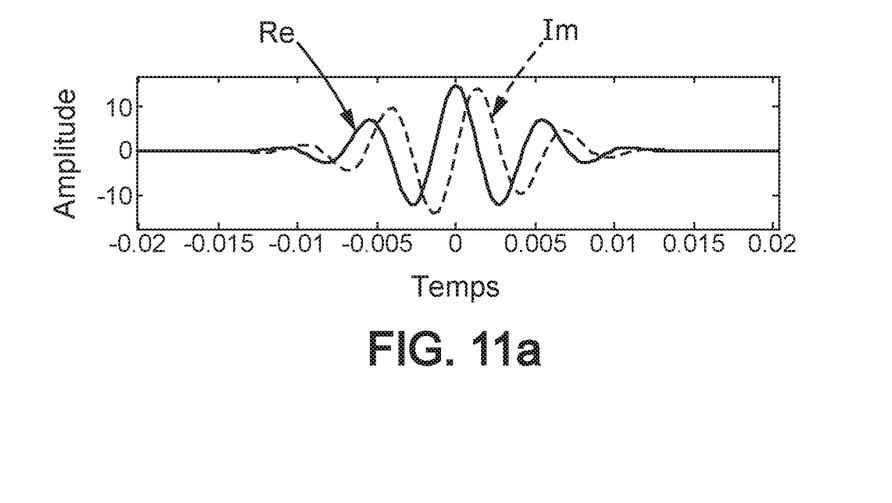
FIGS. 11a, 11b, and 11c illustrate three examples of a mother wavelet function usable in the method of the invention to form the windowed frequency transfer matrix K.
Figures 11B, 11C:
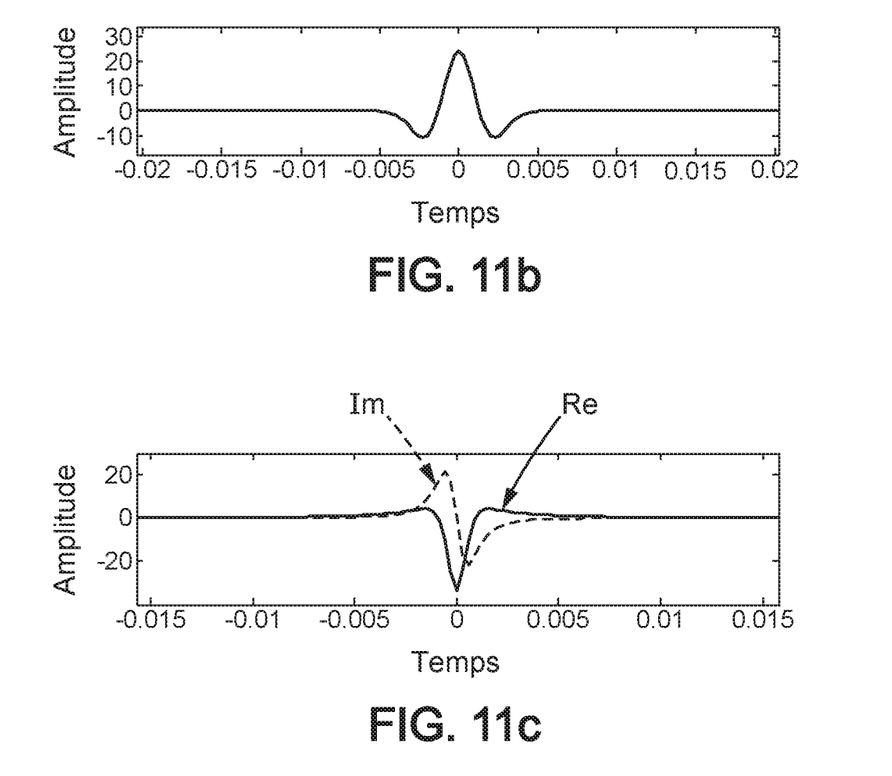

The mother wavelet function y may be selected among:
the Morlet wavelet, for example represented in FIG. 11a:

$$Y(t) = e^{iw_0 t} e^{\frac{-t^2}{2}},$$

and
the Maar wavelet (second Gaussian derivative), for example represented in FIG. 11b:

$$Y(t) = A(1 - t^2)e^{\frac{-t^2}{2}} \text{ with } A = \frac{2}{\sqrt{3}} p^{-1/4},$$

and
the progressive wavelet, for example represented in FIG. 11c:

$$Y(t) = \frac{1}{(t+i)^2}.$$

The family of wavelets can thus be chosen so as to best correspond to the transducer bandwidth and to the type of pulse signals to be processed (therefore to the material of the medium).

Through the use of said wavelet transforms, the method of the invention allows probing the medium by wave propagation to an even greater depth, with greater precision and resolution.

Figure 12:
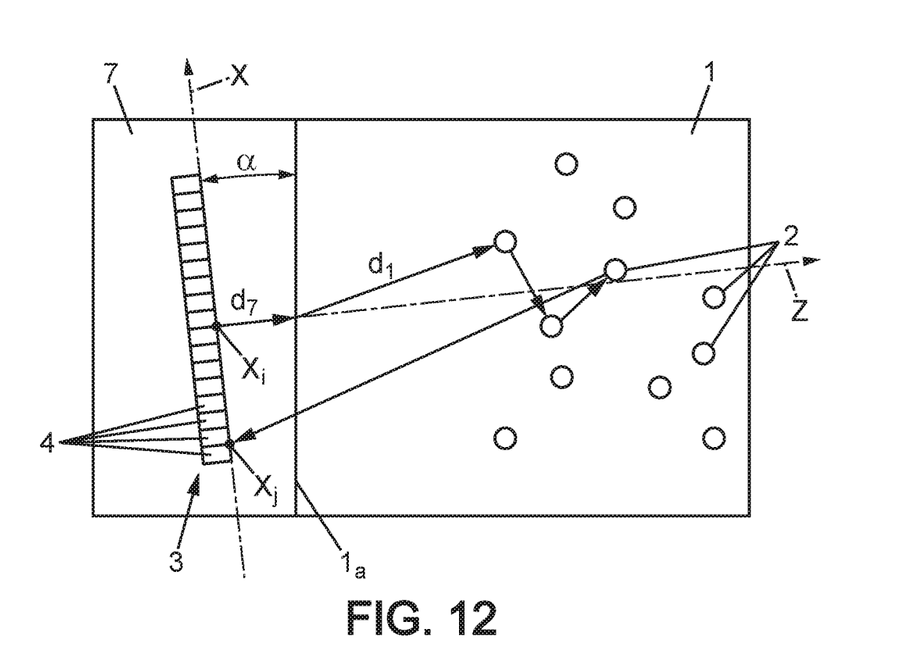
FIG. 12 is a schematic view of a variant of the device, having a plurality of transducers inclined relative to an outer surface of the medium and suitable for implementing an embodiment of a method according to the invention.

In addition, according to an advantageous embodiment, during the emitting step (a), the assembly 3 of transducers emits an incident wave, said incident wave being inclined by a predetermined angle a to an outer surface 1a of said medium 1, as represented in FIG. 12.

To do this, the assembly 3 of transducers is for example placed in a coupling medium 7 as shown. It is possible for this coupling medium 7 to be placed between the assembly 3 and the external surface 1a of the medium to be probed, or this coupling medium 7 is integrated with a probe incorporating at least the assembly and said coupling medium.

The coupling medium 7 has for example a refraction index $n_7$ that is different from the refraction index $n_1$ of the medium 1 to be probed. The propagation speeds in these media are therefore respectively $V_1$ and $V_7$.

Thus, in the projection filtering technique of the filtering substep (c3), the components of the column vector S=[$s_u$] are determined by the following modified formula:

$$S_u = s.\exp\left\{j\frac{k}{2d_f}y_u^2\right\}/\sqrt{L}$$

where
$d_f$ is the focal distance, which is the sum of a first distance $d_7$ traveled in the coupling medium 7 corrected by the variation in index between the two media and a second distance $d_1$ traveled in the medium to be probed; in other words:

$$d_f = d_7.\frac{V_1}{V_7} + d_7$$

Due to the use of the emission of inclined incident waves, the method of the invention is also improved and allows probing the medium by wave propagation to an even greater depth, with greater accuracy and resolution. In particular, it is possible to obtain more information on the geometry of any defects (planar or volumetric) in the probed medium 1.

The invention claimed is:

1. A method for creating an image of a medium by wave propagation, said method comprising:
using a device comprising an assembly of ultrasound transducers and processing means, carrying out
(a) an emitting step during which the assembly of transducers emits an incident wave in a medium which scatters said wave,
(b) a measuring step during which said assembly of transducers captures signals representative of a reflected wave reverberated by the medium from the incident wave, said captured signals comprising:
a simple-scattering component, representative of wave paths where the reflected wave results from a single reflection of the incident wave by each scatterer of the medium,
and where appropriate a multiple-scattering component, representative of wave paths where the reflected wave results from multiple successive reflections of the incident wave on the scatterers of the medium before reaching the assembly of transducers,
(c) a processing step during which said captured signals are processed by the processing means in order to determine characteristics of the medium, at least one component selected among the multiple-scattering component and the simple-scattering component is extracted by filtering at least one frequency transfer matrix representative of responses between transducers of the assembly of transducers, and which comprises at least the following substeps:

(c1) a windowed transfer matrix determination substep during which is determined at least one windowed frequency transfer matrix K(T,f) corresponding to a windowed temporal matrix of inter-element response K[(T,t)=[$k_{ij}$(T,t)], said windowed temporal matrix of inter-element response corresponding, over a time window close to a time T and of duration $\Delta$t, to the temporal responses $h_{ij}$(t) between transducers of the assembly of transducers, f being the frequency, (c2) a data rotation substep during which two matrices A1(T,f) and A2(T,f) are calculated from the windowed frequency transfer matrix K(T,f), by rotations in a first direction and extraction of elements from the windowed frequency transfer matrix, (c3) a filtering substep during which the multiple-scattering component is separated from the simple-scattering component in each of matrices A1, A2, thus obtaining at least two filtered matrices $A1^F$, $A2^F$ respectively corresponding to matrices A1, A2 and each representative of either the simple-scattering component or the multiple-scattering component, (c4) a reverse data rotation substep during which a filtered windowed transfer matrix $K^F$(T,f) is calculated from the two filtered matrices $A1^F$, $A2^F$ by rotations in a second direction opposite the first direction and extraction of elements from the filtered matrices $A1^F$, $A2^F$, wherein:

during the data rotation step (c2), all the components of the windowed frequency transfer matrix K(T,f) are distributed in a central portion of one or the other of the two matrices A1(T,f) and A2(T,f), these matrices having zeroes in a portion external to the central portion, and during the reverse data rotation step (c4), all non-zero components of the central portions of the filtered matrices $A1^F$, $A2^F$ are extracted and placed in the filtered windowed transfer matrix $K^F$(T,f);

(d) and imaging step during which an image of the medium is constructed by the processing means on the bases of the filtered windowed transfer matrix $K^F$(T,f), said image covering a depth of the medium, and (e) a presentation step during which the image is presented as an image on a screen.

2. The method according to claim 1, wherein the windowed transfer matrix K(T,f) is a matrix of size N*N where N is odd, and during the data rotation step (c2) the two matrices A1(T,f)=[$a1_{uv}$(T,f)] and A2=[$a2_{uv}$(T,f)] are calculated from the windowed frequency transfer matrix K(T,f)=[$k_{ij}$(T,f)], by the following relations:

if u+v−1−(N−1)/2 and v−u+(N+3)/2−1 are both between 1 and N, inclusive, then $a1_{uv}$(T,f)=$k_{u+v-1-(N-1)/2,\ v-u+(N+3)/2-1}$(T,f),
else $a1_{uv}$(T,f)=0, and if u+v−(N−1)/2 and v−u+(N+3)/2−1 are both between 1 and N−1, inclusive, then $a2_{uv}$(T,f)=$k_{u+v-(N-1)/2,\ v-u+(N+3)/2-1}$(T,f),
else $a2_{uv}$(T,f)=0.

3. The method according to claim 1, wherein the data rotation substep (c2) comprises:

a first substep (c21) during which the windowed frequency transfer matrix K(T,f) in introduced into an extended matrix Ke(T,f) of greater size, all elements of the extended matrix other than those from the windowed frequency transfer matrix being zero, and a second substep (c22) during which the two matrices A1(T,f) and A2(T,f) are calculated from the extended matrix Ke(T,f).

4. The method according to claim 3, wherein the windowed transfer matrix K(T,f) is a matrix of size N*N where N is odd, and:

during the first substep (c21), the extended matrix Ke(T,f)=[$ke_{ij}$(T,f)] is defined by:
if i∈[1+(N−1)/2; N+(N−1)/2], and
  j∈[1+(N−1)/2; N+(N−1)/2]
then $ke_{ij}$(T,f)=$j_{i-(N-1)/2,j-(N-1)/2}$(T,f),
else $ke_{ij}$(T,f)=0, and during the second substep (c22), the two matrices A1(T,f)=[$a1_{uv}$(T,f)], A2(T,f)=[$a2_{uv}$(T,f)], are calculated by the following relations:
$a1_{uv}$(T,f)=$ke_{u+v-1,\ v-u+(N+3)/2-1+(N-1)/2}$(T,f), and
$a2_{uv}$(T,f)=$ke_{u+v,\ v-u+(N+3)/2-1+(N-1)/2}$(T,f).

5. The method according to claim 1, wherein the windowed transfer matrix K(T,f) is a matrix of size N*N where N is odd, and during the reverse data rotation step (c4) the filtered windowed transfer matrix $K^F$(T,f)=[$k^F_{ij}$(T,f)] is calculated from the filtered matrices $A1^F$(T,f)=[$a1^F_{uv}$(T,f)], $A2^F$(T,f)=[$a2^F_{uv}$(T,f)] by the following relations:

if i-j is even,
then $k^F_{ij}$(T,f)=$a1^F_{(i-j)/2+(N+1)/2,\ (i+j)/2}$,
else $k^F_{ij}$(T,f)=$a2^F_{(i-j-1)/2+(N+1)/2,\ (i+j-1)/2}$.

6. The method according to claim 1, wherein during the windowed transfer matrix determination substep (c1), each windowed frequency transfer matrix K(T,f) is determined by wavelet transform of the windowed temporal matrix K(T,t) corresponding, over said time window close to time T and of duration $\Delta$t, to the temporal responses $h_{ij}$(t) between transducers of the assembly of transducers.

7. The method according to claim 1, wherein the time windows of the various windowed transfer matrices K(T,f) overlap at least pairwise.

8. The method according to claim 1, wherein, during the filtering substep (c3):

a simple-scattering component $k^s_{ij}$(T,f) is extracted from each coefficient $k_{ij}$(T,f) of matrix K(T,f), such that the simple-scattering components $k^s_{ij}$(T,f) are mutually coherent on each antidiagonal of said matrix K(T,f), and a multiple-scattering component $k^M_{ij}$(T,f) is extracted from each coefficient $k_{ij}$(T,f) of matrix K(T,f).

9. The method according to claim 1, wherein, during the emitting step, the incident wave emitted in a medium is inclined by a predetermined angle to an outer surface of said medium.

10. A device for creating an image of a medium by wave propagation, the device comprising:

an assembly of ultrasound transducers adapted to emit an incident wave in a scattering medium and to capture signals representative of a reflected wave reverberated by the medium from the incident wave, said captured signals comprising:

a simple-scattering component, representative of wave paths where the reflected wave results from a single reflection of the incident wave by each scatterer of the medium, and where appropriate a multiple-scattering component, representative of wave paths where the reflected wave results from several successive reflections of the incident wave on the scatterers of the medium before reaching the assembly of transducers, said device further comprising processing means adapted to process said captured signals in order to determine characteristics of the medium, the processing means are adapted to extract at least one component selected among the multiple-scattering component and the simple-scattering component, by filtering at least one frequency transfer matrix representative of the responses between transducers of the assembly of transducers, and the processing means carry out at least the following substeps:

(c1) a windowed transfer matrix determination substep during which is determined at least one windowed frequency transfer matrix K(T,f) corresponding to a windowed temporal matrix of inter-element response K(T,f)=[$k_{ij}$(T,t)], said windowed temporal matrix of inter-element response corresponding, over a time window close to a time T and of duration Δt, to the temporal responses $h_{ij}$(t) between transducers of the assembly of transducers, f being the frequency, (c2) a data rotation substep during which two matrices A1(T,f) and A2(T,f) are calculated from the windowed frequency transfer matrix K(T,f), by rotations in a first direction and extraction of components of the windowed frequency transfer matrix, (c3) a filtering substep during which the multiple-scattering component is separated from the simple-scattering component in each of the matrices A1, A2, thus obtaining at least two filtered matrices $A1^F$, $A2^F$ respectively corresponding to matrices A1, A2 and each representative of either the simple-scattering component or the multiple-scattering component, (c4) a reverse data rotation substep during which a filtered windowed transfer matrix $K^F$(T,f) is calculated from the two filtered matrices $A1^F$, $A2^F$ by rotations in a second direction opposite the first direction and extraction of components from the filtered matrices $A1^F$, $A2^F$, wherein the processing means are adapted so that:

during the data rotation step (c2), all components of the windowed frequency transfer matrix K(T,f) are distributed in a central portion of one or the other of the two matrices A1(T,f) and A2(T,f), these matrices having zeroes in a portion external to the central portion, and during the reverse data rotation step (c4), all the non-zero components of the central portions of the filtered matrices $A1^F$, $A2^F$ are extracted and placed in the filtered windowed transfer matrix $K^F$(T,f);

wherein the processing means are adapted to construct an image of the medium on the bases of the filtered windowed transfer matrix $K^F$(T,f), said image covering a depth of the medium; and wherein the image is presented on a screen.

* * * * *